Jan. 29, 1957 C. W. VOGT 2,779,851
APPARATUS FOR SEVERING OR PERFORATING ADHESIVE TAPE
Filed Jan. 24, 1952 4 Sheets-Sheet 2
FIG.IA.
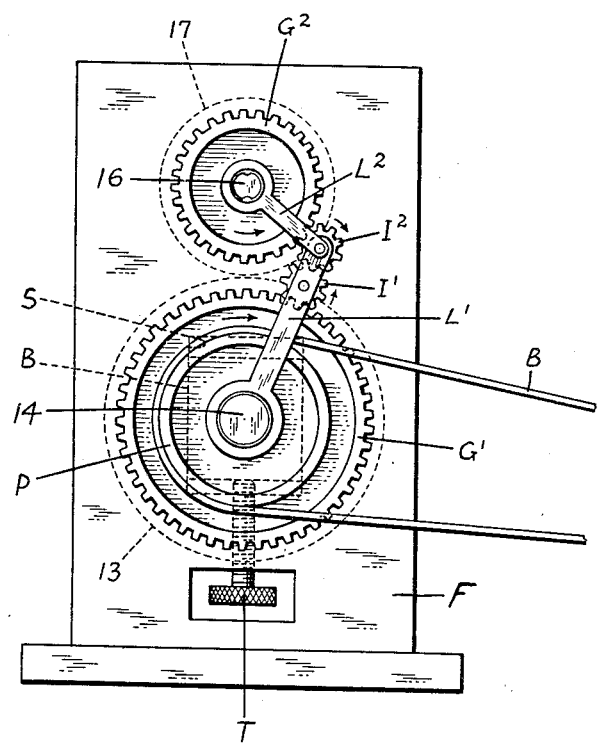
INVENTOR
CLARENCE W. VOGT
BY
HIS ATTORNEYS Jan. 29, 1957

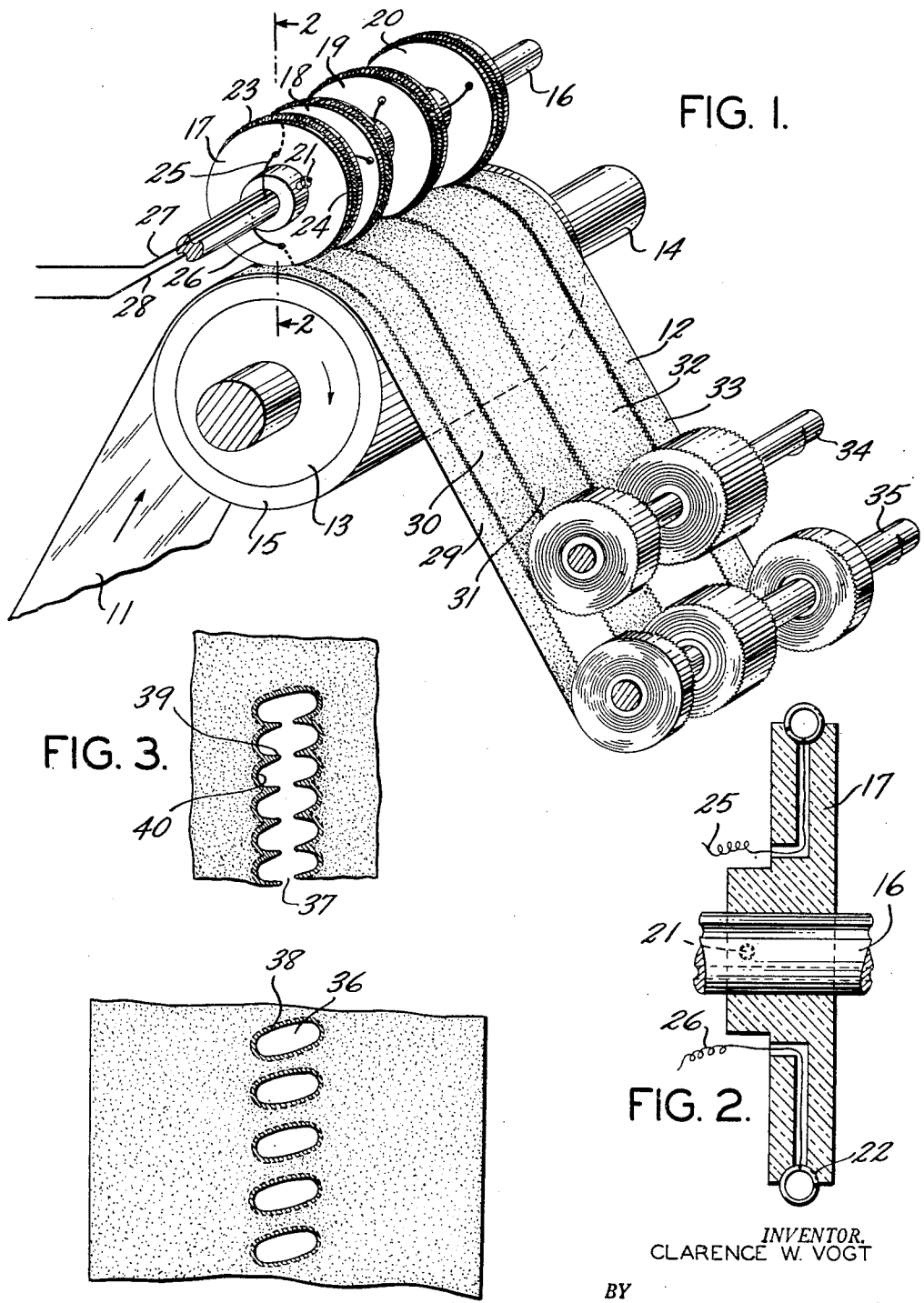

C. W. VOGT 2,779,851

APPARATUS FOR SEVERING OR PERFORATING ADHESIVE TAPE

Filed Jan. 24, 1952

INVENTOR.
CLARENCE W. VOGT
BY
his ATTORNEYS.

INVENTOR.
CLARENCE W. VOGT

United States Patent Office 2,779,851
Patented Jan. 29, 1957

2,779,851

APPARATUS FOR SEVERING OR PERFORATING ADHESIVE TAPE

Clarence W. Vogt, Norwalk, Conn.

Application January 24, 1952, Serial No. 268,099

1 Claim. (Cl. 219—19)

The present invention relates to improved tapes and methods and apparatus for embrittling the edge or edges of tapes, as well as to methods and apparatus for severing one or more tapes from a band of tape material and embodies, more particularly, a method and apparatus by means of which synthetic plastic film tapes may be manufactured with one or more edges thereof formed to facilitate tearing the tape transversely thereof.

The invention further relates to improved forms of packages or bags utilizing tapes of the above character by means of which means may be provided for opening the package or bag with facility and without objectionably imparing the strength of the closure thereof.

In my co-pending application Serial No. 254,535, filed November 2, 1951, for "Tape With Weakened Edge," now Patent No. 2,703,764, dated March 8, 1955, there is described a tape formed with an embrittled edge by means of which tearing of the tape is greatly facilitated. This invention provides an improved form of such tape, as well as a method and apparatus by means of which the tape is formed.

Tapes formed in accordance with this invention not only are useful as tear tapes to facilitate the opening of objects such as cigarette packages, candy bars, and the like (which are wrapped in cellophane or similar synthetic plastic films), but are also useful in chaining commodities together into multiple groups to facilitate the distribution and sale thereof. Examples of such uses are illustrated in my co-pending applications Serial No. 257,035 for "Chained Enwrapments," and Serial No. 270,538 for "Package and Method and Apparatus for Assembling," the latter of which is now abandoned.

To facilitate the manufacture of the form of tape above referred to, as well as the improved form provided by this invention, the method and apparatus of this invention provides for the formation of the desired embrittlement preferably in a continuous operation, for example, in the operation of forming one or more rolls of tape from a relatively wide band of tape material. In this connection, the material of the tape may be of any of the well known synthetic plastic film materials, such as regenerated cellulose and the like, as described in my co-pending application Serial No. 254,535 above referred to, such material being coated with a suitable adhesive of pressure sensitive type such as latex base adhesive materials, or of thermoplastic type such as adhesive material manufactured by the Nashua Gummed and Coated Paper Company, which is the delayed thermoplastic material that becomes tacky at a temperature in the general range of 165 to 180° F. This tackiness is retained for a limited period of time after being cooled below such temperatures. The particular adhesive used forms no part of the present invention.

In order that the invention may be more fully understood, it will now be described in connection with the accompanying drawings, wherein:

Figure 1 is a perspective view of an apparatus constructed in accordance with this invention, showing the mechanism for embrittling tapes while severing them in forming rolls of the tape material;

Figure 1A is an end elevational view of the apparatus of Figure 1 showing mechanism for adjusting the spacing of the rolls thereof;

Figure 2 is an enlarged view in section, taken on the plane indicated by the line 2—2 of Figure 1 and looking in the direction of the arrows, this view showing the manner in which electric current is supplied to the heating and cutting coils;

Figure 3 is a partial plan view, somewhat enlarged, showing the structure of the tape as formed by application of the heating coils thereto;

Figure 4 is another partial plan view, somewhat enlarged, of a portion of tape material of a form different from that of Figure 3 and showing how the invention may be used to form perforations;

Figure 6:
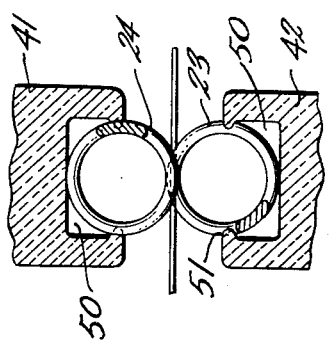
Figure 6 is a partially enlarged view, taken on the plane indicated by the line 6—6 of Figure 5, and looking in the direction of the arrows, this view illustrating the structure of the electrically heated elements for embrittling and severing the tape.

Referring to the form of the invention shown in Figure 1, a web of suitable tape material is illustrated at 11, this web being supplied either from a machine, a roll, or any other suitable source, the adhesive area preferably being on the upper side, as indicated at 12. The lead of the web is over a backup roll 13, mounted upon a shaft 14 that is preferably driven at such speed that the periphery of the roll moves at the speed of the web 11. If desired, the peripheral portion 15 of the roll 13 may be formed of a suitable material such as a net of fiberglass or other yielding material that is unaffected by the heat and pressure applied by the heating elements now to be described.

Mounted with its axis parallel to the shaft 14, and suitably spaced therefrom, is a lay shaft 16 provided with a plurality of discs 17, 18, 19, and 20, the structure of these discs being illustrated in Figure 2 wherein, for example, the disc 17 is illustrated. The discs may be secured to the shaft 16 by means of set screws 21 or the like, and each is formed with a peripheral channel 22 within which pairs of coils 23 and 24 are received. These coils are formed of a suitable material sufficiently resistant to the flow of the electric current to cause them to be heated in accordance with well known practice, and the length of the coils is such that each extends around half of the periphery of the discs 17, 18, 19, and 20. In this fashion by mounting two coils on each disc and by connecting the adjacent ends of each pair of coils together and to lead wires 25 and 26, these coils may be heated by the application of electrical current to the lead wires through supply wires 27 and 28. Suitable commutator mechanism may be provided to furnish electrical current to the wires 27 and 28 from a stationary supply in accordance with well known practice.

As the web 11 is moved over the backup roll 13 with the heating coils of one or more of the discs 17, 18, 19, and 20 in engagement with the web, the material of the web is severed by the application of heat thereto, and the web is formed into one or more bands of tape 29, 30, 31, 32, and 33. A plurality of shafts 34 and 35 is suitably driven to take up the bands 27 to 33, inclusive, and in this fashion, a plurality of rolls of tap is provided having one or more edges thereof serrated and embrittled, as illustrated in Figure 3. The tackiness or thermoplastic characteristics of the adhesive in these heated areas is prefereably vitiated or destroyed as a result of the heat.

It will be understood that the voltage applied to the respective heating coils of the tape modifying mechanism is suitably controlled so that a desired temperature of the coils is achieved during operation. This temperature should be sufficient to destroy the material of the web at the point of contact of the respective convolutions of the heating coils therewith and produce a non-lineal contour at the edge of the tape. It will be understood, of course, that by varying the space between the shafts 14 and 16, the extent of contact of the convolutions of the coils with the web may be varied. A typical mechanism for this purpose is illustrated in Figure 1A and includes an end frame F at each end of the rolls rotatably receiving the shafts 14 and 16. Bearing blocks B support each end of the shaft 14 and are slidable up and down in guide slots S in the end frames F. The vertical position of each bearing block can be adjusted by means of screws T which are threaded into the frame F and engage the lower end of each bearing block B. By rotating the screws T, the bearing block can be moved up or down in the slot thereby moving the roller 13 toward and away from the cutting rolls 17, 18, 19 and 20.

Inasmuch as it is desirable to have the rollers 13 and 17 to 20 rotate in opposite directions at the same peripheral speed, the shaft 14 is provided with a gear $G^1$ which drives an idler gear $I^1$ which in turn meshes with an idler gear $I^2$ meshing with a gear $G^2$ fixed to the shaft 16. The idler $I^1$ is rotatably mounted on the pivotally movable link $L^1$ which is supported for swinging movement on the shaft 14. The idler $I^2$ is rotatably mounted at the axis of the pivot which connects the links $L^1$ and $L^2$. The link $L^2$ is pivotally supported on the shaft 16. Thus the meshing relation between the gears and the idlers remains unchanged in all adjusted positions of the shafts 14 and 16. Provision of dual idlers enables the rollers 13 and 17 to 20 to rotate in opposite directions at the same speed. The rollers may be driven by means of a belt B or its equivalent which engages around a pulley P fixed to the shaft 14. If the contact of these convolutions of the coils is of only a limited extent, perforations 36, such as illustrated generally in Figure 4, result. More extensive contacts (or closer windings of finer pitch) results in a severance of the tape, as illustrated at 37 in Figure 3. In each instance, however, the marginal portions 38 of the perforations 36 or the severed portions 37 will contain adhesive material, the structure of which has been destroyed or impaired, as illustrated by the shaded portions in Figures 3 and 4. These embrittled portions result from the application of heat to the adhesive 12 and provide a convenient and effective way for starting the transverse tear of the tapes, as explained in the above identified co-pending applications.

Figure 5:
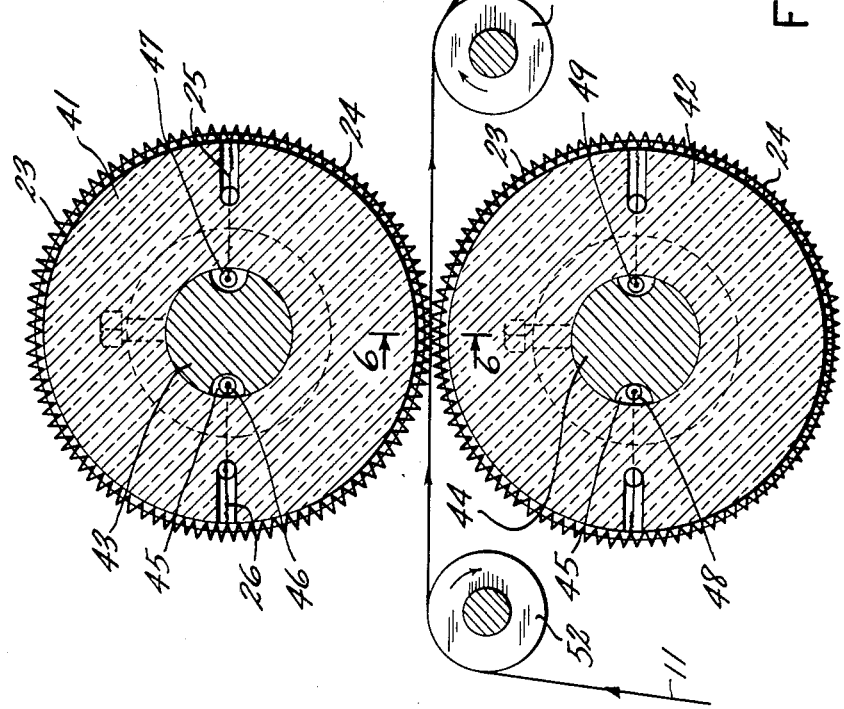
Figure 5 is a view in end elevation showing a modified form of apparatus constructed in accordance with this invention.
Figure 7:
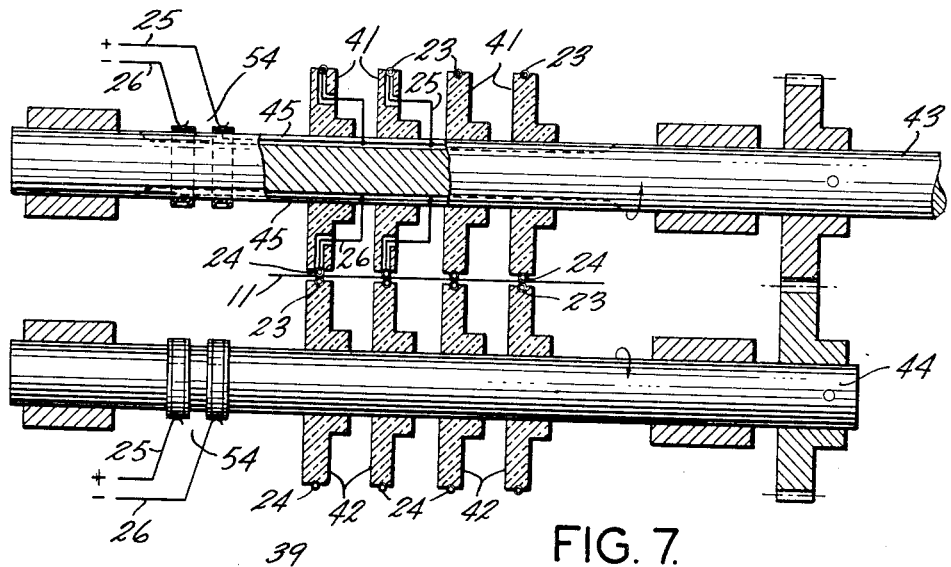
Figure 7 is a view in section, taken in a plane passing through the axes of the rotatable elements shown in Figure 5, and showing a plurality of such elements, this view illustrating particularly the manner in which the electric current may be supplied to the rotating elements.

Referring to Figures 5, 6, and 7, a modified form of the invention is illustrated. In this form of the invention the web of tape material 11 is severed and embrittled by oppositely spaced wheels 41 and 42 which are preferably formed of non-conducting material. These wheels are mounted upon parallel shafts 43 and 44, each having diametrically opposed and axially extending channels 45 formed therein to receive electrical conductors 46, 47, 48 and 49 in the channels of the respective shafts.

The peripheries of the wheels are formed as illustrated in Figure 6 with channels 50, the marginal portions of which may be provided with notched lips 51 to receive the convolutions of the coils 23 and 24. The web 11 passes over drive rolls 52 and 53 and moves tangentially between the wheels 41 and 42, as illustrated in Figure 5. The shafts 43 and 44 are so driven that the convolutions of the coils 23 and 14 alternate in position as they approach and move through the limited arc of contact with the web 11. In other words, these convolutions, in effect, intermesh although they may not actually come in contact with each other.

As illustrated in Figure 7, suitable commutator mechanism, illustrated generally at 54, is provided for supplying electrical current to the leads 46 to 49, inclusive. By driving the shafts 43 and 44 in synchronism, the potential on the various convolutions of the respective coils at the point of contact thereof with the web may be substantially equal, and thus if these coils should come in contact, there would be no arcing.

Figure 8:
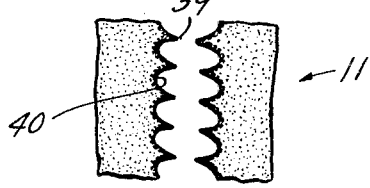
Figure 8 is an enlarged partial view showing a portion of the tape material after it has been severed and embrittled.
Figure 10:
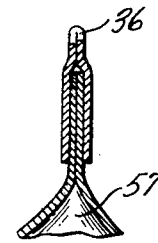
Figure 10 is a partial view in section, taken on the line 10—10 of Figure 9, and looking in the direction of the arrows.
Figure 9:
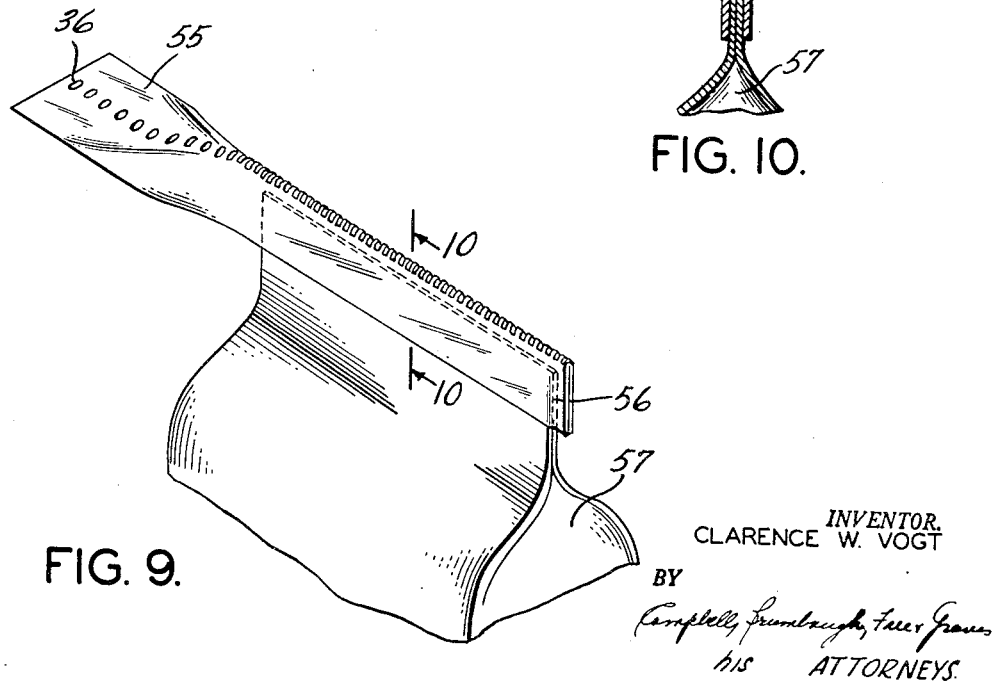
Figure 9 is a view in section showing a portion of a container which has been closed by the tape material illustrated in Figure 4.

Here again the nature of the operation impressed upon the web may be varied by suitably adjusting the spatial relationship between the shafts 43 and 44. Figure 8 illustrates the result of the operation of the mechanism shown in Figure 5 where the axes of the shafts are sufficiently close to produce severing of the web. This is similar to the operation depicted in Figure 3. Less extensive contact of the convolutions of the coils shown in Figure 5 with the web 11 produces the band 55, as illustrated in Figure 9, this band or tape being similar to that shown in Figure 4, and having the perforations 36 formed therein with the marginal embrittled portions 38, as illustrated in Figure 4. If desired, this band may be folded in the line of the perforations 36 and applied to the closed mouth 56 of a bag or other receptacle 57. As illustrated in Figure 10, the opening of the bag is greatly facilitated by the plurality of weakened portions provided by the apertures 36 which, as illustrated in Figure 10, become notches at each of which the resistance to tear is greatly reduced.

The spiral convolutions of the coils 23 and 24 also form serrated edges in which peaks 39 and valleys 40 further facilitate the transverse tearing of the tapes. Where the bands 29 to 33 are re-rolled, as illustrated in Figure 1, it is important to destroy the effectiveness of the adhesive material under the embrittled marginal portions, as above described, otherwise there will be difficulty in unrolling the tape from the respective rolls without tearing it transversely during such unrolling.

It will be observed that, by providing the pairs of coils 23 and 24 and connecting them in parallel, as illustrated, no difficulty is experienced because of the likelihood of short circuits. The pairs of coils are connected in parallel and thus adjacent portions thereof are not subjected to different voltages. While the heating and severing has been shown as being produced by electric heating elements, this result can be accomplished equally well by any of several alternative ways such as, for example, by hollow knurled rolls mounted on tubular shafts through which a heating fluid is circulated; by inductive heating of knurled rollers; or in some cases by flame cutting of the web.

With the use of some adhesives, thermoplastics and films, there is a tendency, when heated to their flow points, to build up the caliper or thickness along the edges of the area contacted, or remaining after exposure to heated member or element.

In these cases, difficulty may be encountered in obtaining proper uniform rolls. This may be corrected by ironing these areas by pressure rollers shaped and located to attenuate these areas, bringing them to the same or lesser thickness than the remainder of the web.

While the invention has been described with specific reference to the accompanying drawings, it is not to be limited save as defined in the appended claim.

I claim:

Apparatus for forming tapes having an adhesive material on at least one side thereof, comprising a rotatable member having a circular periphery, a heating coil carried by the periphery of the last named member with the outer portions of the convolutions thereof in spaced circumferential relationship, means to supply an electrical current to the coil, and means to move a tape into engagement with the outer portions of the convolution of the coil, said means to move the tape into engagement with the tape engaging member including means to vary the extent of such engagement.

References Cited in the file of this patent

UNITED STATES PATENTS

| | | |
|---|---|---|
| 751,527 | Marr | Feb. 9, 1904 |
| 2,251,282 | Huizeng | Aug. 5, 1941 |
| 2,293,178 | Stocker | Aug. 18, 1942 |
| 2,385,246 | Wilsey et al. | Sept. 18, 1945 |
| 2,430,920 | Dodge | Nov. 18, 1947 |
| 2,623,586 | Volpi | Dec. 30, 1952 |